US008750558B2

(12) United States Patent
Lee et al.

(10) Patent No.: US 8,750,558 B2
(45) Date of Patent: Jun. 10, 2014

(54) ELECTRONIC DEVICE AND METHOD FOR VIEWING ELECTRONIC CONFIDENTIAL DOCUMENT

(75) Inventors: Chung-I Lee, New Taipei (TW); Chien-Fa Yeh, New Taipei (TW); Shan-Chuan Jeng, New Taipei (TW); Cheng-Feng Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 397 days.

(21) Appl. No.: 13/213,095

(22) Filed: Aug. 19, 2011

(65) Prior Publication Data

US 2012/0106779 A1 May 3, 2012

(30) Foreign Application Priority Data

Nov. 3, 2010 (TW) ............................... 99137707 A

(51) Int. Cl.
*G06T 3/00* (2006.01)

(52) U.S. Cl.
USPC .............................. 382/100; 380/205; 726/26

(58) Field of Classification Search
CPC ..... H04N 1/444; H04N 1/448; H04N 1/4493; H04N 5/913; H04N 7/167; H04N 13/0429; H04N 13/0438; H04N 2005/913; H04N 2005/91357; H04N 2005/91364; G09G 2320/06; G09G 2320/0613; G09G 2358/00; G06F 21/60; G06F 21/84; H04K 1/02
USPC .................. 382/100, 284; 380/205, 207, 208; 345/7, 9; 726/26; 348/206, 500, 512, 348/513
See application file for complete search history.

(56) References Cited

U.S. PATENT DOCUMENTS

| | | | | |
|---|---|---|---|---|
| 5,629,984 | A * | 5/1997 | McManis | 380/54 |
| 6,529,209 | B1 * | 3/2003 | Dunn et al. | 345/629 |
| 6,597,328 | B1 * | 7/2003 | Stern et al. | 345/9 |
| 2003/0026449 | A1 * | 2/2003 | Yerazunis et al. | 382/100 |
| 2003/0128218 | A1 * | 7/2003 | Struyk | 345/581 |
| 2003/0133569 | A1 * | 7/2003 | Stern et al. | 380/206 |
| 2006/0221067 | A1 * | 10/2006 | Kim et al. | 345/204 |
| 2010/0020237 | A1 * | 1/2010 | Miyasaka et al. | 348/563 |

FOREIGN PATENT DOCUMENTS

| | | | |
|---|---|---|---|
| JP | 2001255844 A | 9/2001 | G09G 3/20 |
| JP | 201110055 A | 1/2011 | H04N 13/04 |

* cited by examiner

*Primary Examiner* — Andrew W Johns
(74) *Attorney, Agent, or Firm* — Novak Druce Connolly Bove + Quigg LLP

(57) ABSTRACT

An electronic confidential document viewing method is performed by an electronic device in electronic communication with a pair of eyeglasses. In response to display a confidential document on a display device, a protection image is generated based on a security image of the confidential document. The protection image is a copy of the security image that is offset from the security image by a predetermined distance in a vertical direction or a horizontal direction. The security image and the protection image are synchronously transmitted to the display device. The display device displays an overlapping picture based on the two images. The eyeglasses receive the overlapping picture, and separate the overlapping picture into two images. One of the two images is viewable by the left eye of a viewer, and another image is viewable by the right eye of the viewer.

18 Claims, 5 Drawing Sheets

ELECTRONIC DEVICE AND METHOD FOR VIEWING ELECTRONIC CONFIDENTIAL DOCUMENT

BACKGROUND

1. Technical Field

Embodiments of the present disclosure generally relate to electronic documents, and more particularly to an electronic device and an electronic confidential document viewing method.

2. Description of Related Art

Electronic documents, such as electronic contracts or purchase orders may contain sensitive or private contents. In order to protect the confidentiality of the contents shown on a display device, an electronic device and method for viewing confidential documents is needed.

DETAILED DESCRIPTION

In general, the word "module," as used hereinafter, refers to logic embodied in hardware or firmware, or to a collection of software instructions, written in a programming language, such as, for example, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
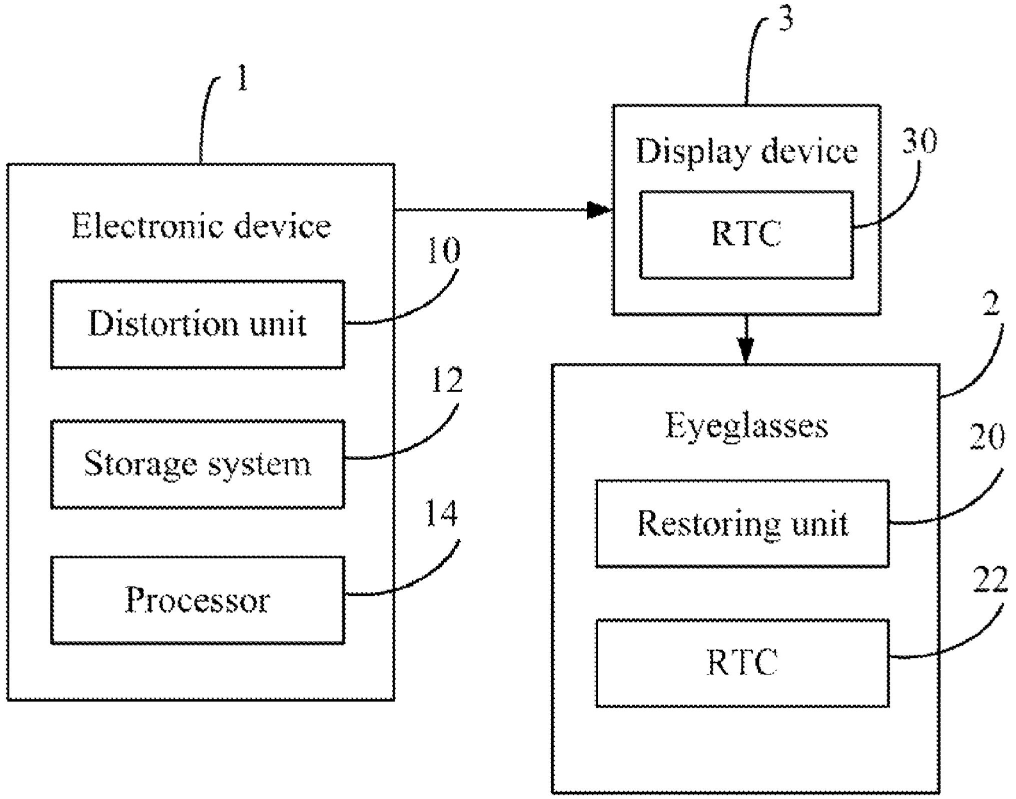
FIG. 1 is a block diagram of one embodiment of an electronic device including a distortion unit communicating with a pair of eyeglasses including a restoring unit.

FIG. 1 is a block diagram of one embodiment of an electronic device 1 including a distortion unit 10. The electronic device 1 electronically connects to a display device 3, and communicates with a pair of eyeglasses 2 that includes a restoring unit 20. In the embodiment, functions of the distortion unit 10 are implemented by the electronic device 1, and functions of the restoring unit 20 are implemented by the eyeglasses 2. When a confidential document is displayed on the display device 3, the distortion unit 10 can horizontally or vertically move a security image of the confidential document a predetermined distance, to generate a protection image based on the security image. In the embodiment, the security image (labeled as "A1" shown in FIG. 4) is a picture of contents of the confidential document. The protection image is a copy of the security image that is offset from the security image by a distance "s" in a vertical direction or a horizontal direction (e.g., distance "s" shown in FIG. 5). The security image and the protection image are composed of an overlapping picture (labeled as "A2" shown in FIG. 4). By synchronously transmitting the security image and the protection image to the display device 3 after at least one clock cycle of the display device 3 according to a fixed frequency of the display device 3, the display device 3 may display a sequence of overlapping pictures based on the security image and the protection image. When a viewer wears the eyeglasses 2, the restoring unit 20 can separate the overlapping pictures into two images, and provide each of the two images to each eye of the viewer. That is, a viewer who does not wear the eyeglasses 2 is prevented from clearly seeing the security image because the protection image is displayed on the display device 3.

In the embodiment, the predetermined distance is determined by a display size of the display device 3 and font size of the security image. The fixed frequency is determined by a display frequency (e.g., 120 Hz) of the display device 3. For example, if the display frequency of the display device 3 is 120 Hz, the fixed frequency may be 60 Hz or 30 Hz, for example. The confidential documents may be contracts or purchase orders, for example.

In one embodiment, the electronic device 1 may be a computer, a portable electronic device, or any other electronic device that includes a storage system 12 and at least one processor 14. In one embodiment, the storage system 12 may be a magnetic or an optical storage system, such as a flash memory.

In the embodiment, the electronic device 3 includes a real time clock (RTC) 30. The pair of the eyeglasses 2 may further include a RTC 22.

Figure 2:
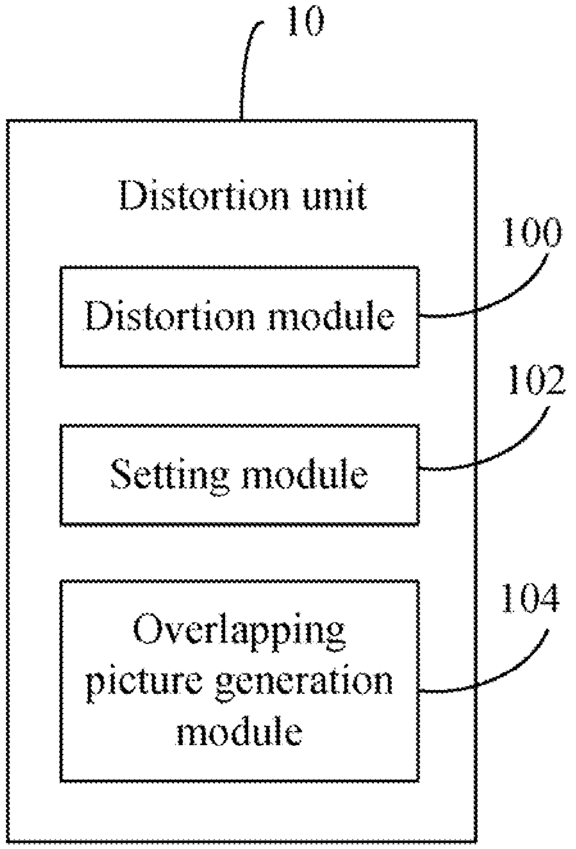
FIG. 2 is block diagram of one embodiment of function modules of the distortion unit in FIG. 1.

FIG. 2 is block diagram of function modules of the distortion unit 10. In one embodiment, the distortion unit 10 includes a distortion module 100, a setting module 102, and an overlapping picture generation module 104. Each of the modules 100-104 may be a software program including one or more computerized instructions that are stored in the storage system 12 and executed by the processor 14.

In response to display a confidential document on the display device 3, the distortion module 100 generates a protection image (labeled as "A2" shown in FIG. 4) based on a security image (labeled as "A1" in FIG. 4 and FIG. 5) of the confidential document on the display device 3. The protection image is a copy of the security image that is offset from the security image by a predetermined distance in a vertical direction or a horizontal direction. In one embodiment, the predetermined distance "s" can be determined by a display size of the display device 3 and font size of the security image, for example, the predetermined distance can be half of a word.

The setting module 102 sets one of the security image and the protection image as a first image, and sets another image as a second image. For example, the distortion module 100 may set the security image as the second image, and set the protection image as the first image. In the embodiment, the first image may be viewable by one eye of a viewer who wears the eyeglasses 2, and the second image may be viewable by the another eye of the viewer.

Figure 4:
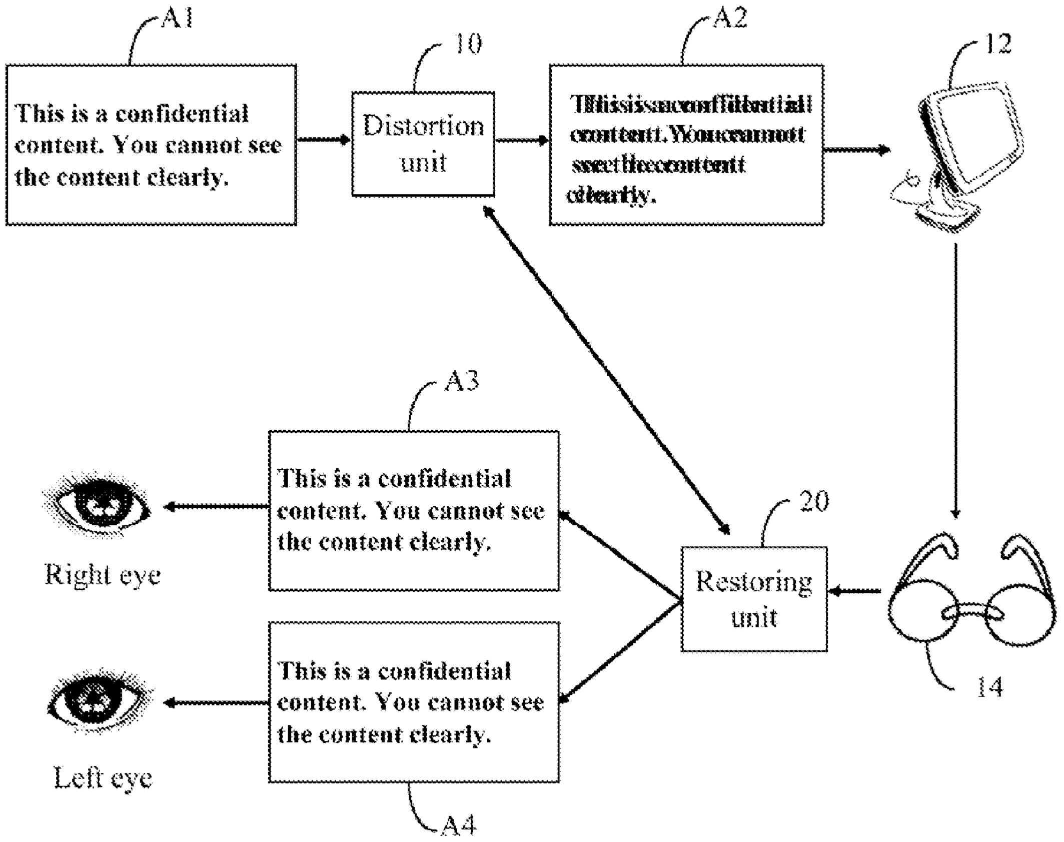
FIG. 4 is a schematic diagram illustrating one example of distorting a security image of the confidential document.
Figure 5:
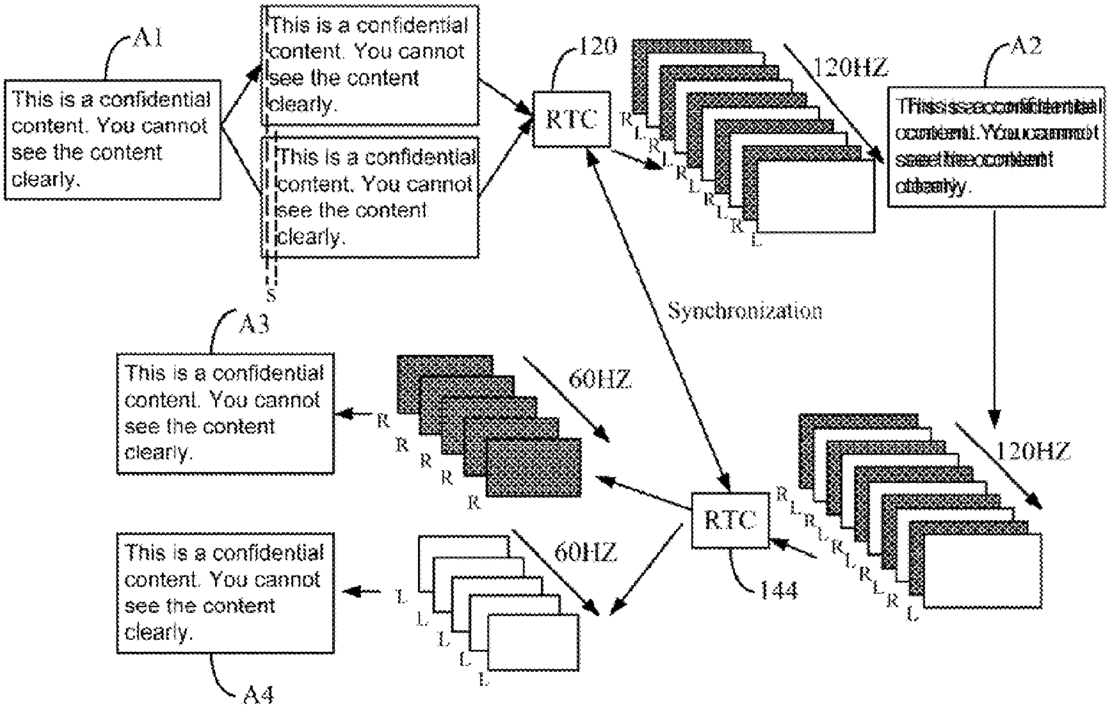
FIG. 5 is a schematic diagram illustrating one example of separating an overlapped image into two images.

The overlapping picture generation module 104 synchronously transmits the first image and the second image to the display device 3 after at least one clock cycle of the display device 3 according to a fixed frequency of the display device 3, and displays an overlapping picture based on the security image and the protection image. The fixed frequency is determined by the display frequency of the display device 3. As illustrated in FIG. 5, for example, if the display frequency of the display device 3 is 120 Hertz and one image is represented by frames, the display device 3 can display the image by 120 frames. If the distortion module 100 sets the security image as the second image and sets the protection image as the first image, the security image and the protection image can be transmitted as "RLRLRLRL . . . " That is, the odd numbers of frames represent the second image, and the even numbers of frames represent the first image. Without wearing the eyeglasses 2, the viewer may see an overlapping picture, and cannot identify contents of the confidential document. As illustrated in FIG. 4 and FIG. 5, the block diagram labeled as "A2" represents the overlapping picture.

When the viewer wears the eyeglasses 2, the RTC 22 receives clock signals transmitted from the RTC 30 of the display device 3, and synchronizes the RTC 22 of the eyeglasses 2 and the RTC 30 of the display device 3 according to the clock signals of the RTC 30. In the embodiment, the clock signals can be transmitted by a wired or wireless connection. The clock signals may include sync signals of high pulse and low pulse of the fixed frequency, and distortion parameters, such as parameters set to the first image and the second image. For example, setting the odd numbers of frames as the first image, and setting the even numbers of frames as the second image.

The restoring unit 20 separates the overlapping picture into two images. In detail, the restoring unit 20 separates the first image from the overlapping picture, and separates the second image from the overlapping picture. As shown in FIG. 4 and FIG. 5, the separated images include the second image A3 and the first image A4.

The first image A4 is viewable by the left eye of the viewer, and the second image A3 is viewable by the right eye of the viewer.

Figure 3:
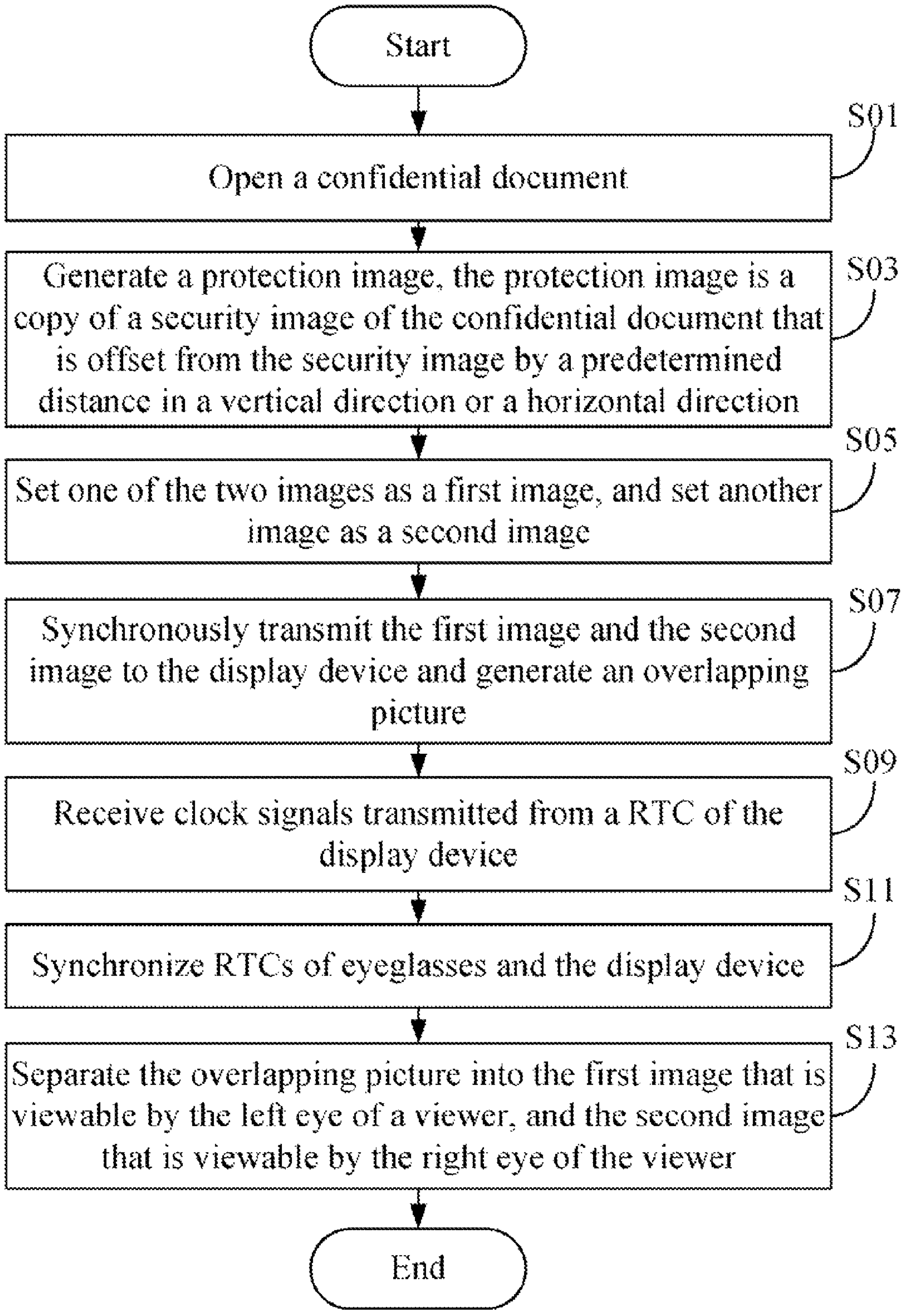
FIG. 3 is a flowchart illustrating one embodiment of a method for viewing a confidential document.

FIG. 3 is a flowchart illustrating one embodiment of method for viewing a confidential document of the electronic device 1 of FIG. 1. Depending on the embodiment, additional blocks may be added, others removed, and the ordering of the blocks may be changed.

In block S01, a viewer opens a confidential document stored in the electronic device 1.

In block S03, the distortion module 100 generates a protection image (labeled as "A2" shown in FIG. 4) based on a security image (labeled as "A1" in FIG. 4 and FIG. 5) of the confidential document on the display device 3. The protection image is a copy of the security image that is offset from the security image by a predetermined distance in a vertical direction or a horizontal direction.

In block S05, the setting module 102 sets the security image or the protection image as a first image, and sets the other image as a second image. For example, the distortion module 100 may set the security image A1 as the second image, and set the protection image as the first image. The first image may be viewable by the left eye of the viewer, and the second image may be viewable by the right eye of the viewer.

In block S07, the overlapping picture generation module 104 synchronously transmits the first image and the second image to the display device 3 after at least one clock cycle of the display device 3 according to a fixed frequency of the display device 3, and generates an overlapping picture based on the security image and the protection image. The overlapping picture is displayed on the display device 3, which is labeled as "A2" shown in FIG. 4 and FIG. 5.

In the embodiment, the fixed frequency is determined by a display frequency of the display device 3. For example, if the display frequency of the display device 3 is 120 Hz, the fixed frequency may be 60 Hz or 30 Hz.

When the viewer wears the eyeglasses 2, in block S09, the RTC 22 receives clock signals transmitted from the RTC 30 of the display device 3.

In block S11, the RTC 22 synchronizes the RTC 22 of the eyeglasses 2 and the RTC 30 of the display device 3 according to the clock signals of the RTC 30. In the embodiment, the clock signals can be transmitted by a wired or wireless connection. The clock signals may include sync signals of high pulse and low pulse of the fixed frequency, and distortion parameters, such as parameters set to the first image and the second image. For example, setting the odd numbers of frames as the first image, and setting the even numbers of frames as the second image.

In block S13, the restoring unit 20 separates the overlapping picture into two images. In detail, as shown in FIG. 4 and FIG. 5, the separation module 202 separates the first image A4 from the overlapping picture that is viewable by the left eye of a viewer, and separates the second image A3 from the overlapping picture that is viewable by the right eye of the viewer.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for a display device, the method comprising:

in response to displaying a confidential document on the display device, generating a protection image based on a security image of the confidential document, wherein the protection image is a copy of the security image that is offset from the security image by a predetermined distance in a vertical direction or a horizontal direction;

synchronously transmitting the security image and the protection image to the display device after at least one clock cycle of the display device according to a fixed frequency of the display device;

displaying an overlapping picture on the display device based on the security image and the protection image; and separating the overlapping picture into a first image and a second image, wherein the first image is viewable by the left eye of a viewer, and the second image is viewable by the right eye of the viewer.

2. The method as described in claim 1, further comprising:

receiving clock signals of a real-time clock of the display device by a real-time clock of a pair of eyeglasses; and synchronizing the real-time clock of the eyeglasses and the real-time clock of the display device according to the clock signals of the real-time clock of the display device.

3. The method as described in claim 2, wherein the clock signals comprise sync signals of high pulse and low pulse of the fixed frequency, and distortion parameters that comprise parameters set to the first image and the second image.

4. The method as described in claim 2, wherein the clock signals are transmitted by a wired or wireless connection.

5. The method as described in claim 1, wherein the predetermined distance is determined by a display size of the display device and font size of the security image.

6. The method as described in claim 1, wherein the fixed frequency is determined by a display frequency of the display device.

7. An electronic device in communication with a pair of eyeglasses, the electronic device comprising:

at least one processor;

a display device;

a storage system; and one or more modules that are stored in the storage system and executed by the at least one processor, the one or more modules comprising:

a distortion module operable to generate a protection image based on a security image of a confidential document, in response to displaying the confidential document on the display device, wherein the protection image is a copy of the security image that is offset from the security image by a predetermined distance in a vertical direction or a horizontal direction;

an overlapping picture generation module operable to synchronously transmit the security image and the protection image to the display device after at least one clock cycle of the display device according to a fixed frequency of the display device, and display an overlapping picture on the display device based on the security image and the protection image; and wherein the pair of eyeglasses is operable to separate the overlapping picture into a first image and a second image, the first image is viewable by the left eye of a viewer, and the second image is viewable by the right eye of the viewer.

8. The electronic device as described in claim 7, wherein the predetermined distance is determined by a display size of the display device and font size of the security image.

9. The electronic device as described in claim 7, wherein the fixed frequency is determined by a display frequency of the display device.

10. The electronic device as described in claim 7, wherein the eyeglasses further comprise a real time clock for receiving clock signals transmitted from a real-time clock of the display device by a real-time clock of a pair of eyeglasses, and synchronizing the real-time clock of the eyeglasses and the real-time clock of the display device according to the clock signals of the real-time clock of the display device.

11. The electronic device as described in claim 10, wherein the clock signals are transmitted by a wired or wireless connection.

12. The electronic device as described in claim 10, wherein the clock signals comprise sync signals of high pulse and low pulse of the fixed frequency, and distortion parameters that comprise parameters set to the first image and the second image.

13. A non-transitory storage medium having stored thereon instructions that, when executed by a processor of an electronic device, causes the processor to perform a method for viewing a confidential document on a display device, the method comprising:

in response to displaying a confidential document on the display device, generating a protection image based on a security image of the confidential document, wherein the protection image is a copy of the security image that is offset from the security image by a predetermined distance in a vertical direction or a horizontal direction;

synchronously transmitting the security image and the protection image to the display device after at least one clock cycle of the display device according to a fixed frequency of the display device;

displaying an overlapping picture on the display device based on the security image and the protection image; and separating the overlapping picture into a first image and a second image, wherein the first image is viewable by the left eye of a viewer, and the second image is viewable by the right eye of the viewer.

14. The storage medium as described in claim 13, wherein the method further comprises:

receiving clock signals of a real-time clock of the display device by a real-time clock of a pair of eyeglasses; and synchronizing the real-time clock of the eyeglasses and the real-time clock of the display device according to the clock signals of the real-time clock of the display device.

15. The storage medium as described in claim 14, wherein the clock signals comprise sync signals of high pulse and low pulse of the fixed frequency, and distortion parameters that comprise parameters set to the first image and the second image.

16. The storage medium as described in claim 14, wherein the clock signals are transmitted by a wired or wireless connection.

17. The storage medium as described in claim 13, wherein the predetermined distance is determined by a display size of the display device and font size of the security image.

18. The storage medium as described in claim 13, wherein the fixed frequency is determined by a display frequency of the display device.

* * * * *